United States Patent
Oota et al.

(10) Patent No.: US 8,208,008 B2
(45) Date of Patent: Jun. 26, 2012

(54) APPARATUS, METHOD, AND PROGRAM FOR DISPLAYING STEREOSCOPIC IMAGES

(75) Inventors: Takeshi Oota, Miyagi (JP); Norihisa Sutoh, Miyagi (JP); Toshiharu Ueno, Miyagi (JP); Kazu Mishiba, Miyagi (JP); Mikio Watanabe, Miyagi (JP); Yoichi Sawachi, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 661 days.

(21) Appl. No.: 12/379,943

(22) Filed: Mar. 4, 2009

(65) Prior Publication Data

US 2009/0237494 A1    Sep. 24, 2009

(30) Foreign Application Priority Data

Mar. 5, 2008 (JP) ................. 2008/054233

(51) Int. Cl.
H04N 13/00 (2006.01)
H04N 15/00 (2006.01)
(52) U.S. Cl. ........................................ 348/42
(58) Field of Classification Search ............ 348/42
See application file for complete search history.

(56) References Cited

U.S. PATENT DOCUMENTS

| | | | |
|---|---|---|---|
| 7,643,552 B2 * | 1/2010 | Saishu et al. ............ | 375/240.01 |
| 2002/0008906 A1 | 1/2002 | Tomita | |
| 2007/0182730 A1 | 8/2007 | Mashitani et al. | |
| 2011/0169825 A1 * | 7/2011 | Ishiyama et al. ............ | 345/419 |

FOREIGN PATENT DOCUMENTS

| | | |
|---|---|---|
| JP | 5-346778 A | 12/1993 |
| JP | 8-249493 | 9/1996 |
| JP | 2000-224612 A | 8/2000 |
| JP | 2001-326947 A | 11/2001 |
| JP | 2002-271816 | 9/2002 |
| JP | 2004-140059 A | 5/2004 |
| JP | 2004-354540 | 12/2004 |
| JP | 2006-340017 A | 12/2006 |
| WO | WO 2004/082297 A1 | 9/2004 |

OTHER PUBLICATIONS

Japanese Office Action dated Oct. 5, 2010, with English translation.

* cited by examiner

Primary Examiner — George C Neurauter
(74) Attorney, Agent, or Firm — McGinn IP Law Group, PLLC (57) ABSTRACT

A stereoscopic image display apparatus is constituted by: an image obtaining section for obtaining a plurality of images, which are obtained by photography of a subject from different positions; a distance measuring section, for measuring the distance to the subject; a stereoscopic image generating section, for generating a stereoscopic image for three dimensional display from the plurality of images; a display region generating section, for generating display regions that display the images in manners corresponding to the distance, when the display regions are displayed overlapped in the stereoscopic image; and a display section, for displaying the stereoscopic image, on which the display regions are overlapped.

9 Claims, 7 Drawing Sheets

APPARATUS, METHOD, AND PROGRAM FOR DISPLAYING STEREOSCOPIC IMAGES

BACKGROUND OF THE INVENTION

1. Field of the Invention

The present invention relates to a stereoscopic image display apparatus, a stereoscopic image display method, and a program that causes a computer to execute a stereoscopic image display method, for displaying stereoscopic images which are generated from a plurality of images.

2. Description of the Related Art

Various methods have been proposed to perform three dimensional display, in which planar images are displayed to be perceived as three dimensional images. In three dimensional display, parallax, which occurs due to the distance between right eyes and left eyes, is intentionally generated to cause three dimensional perception, in which images appear to float out from display surfaces. For example, in three dimensional visual perception according to the naked eye parallel viewing method, two images that each correspond to the right eye and the left eye respectively are prepared, and three dimensional display is realized by shifting the position of a single object within the two images in the horizontal direction to generate a stereoscopic image.

In addition, methods for performing three dimensional display by generating stereoscopic images from a plurality of overlapped images having different colors such as red and blue, and by generating stereoscopic images from a plurality of images which are combined such that the lines thereof are alternately arranged, have also been proposed. In these methods, the stereoscopic images can be viewed three dimensionally, by the eyes stereoscopically viewing the stereoscopic images which are displayed using red/blue glasses or polarizing glasses. It is also possible to display the stereoscopic images on a stereoscopic display monitor, which obviates the use of the polarizing glasses and the like.

Compound lens cameras that have a plurality of imaging sections in order to perform three dimensional display have also been proposed. These compound lens cameras are capable of generating stereoscopic to perform three dimensional display during photography. When camera operations are to be performed during the three dimensional display, it is necessary to display menu screens to input operation commands. However, stereoscopic images are displayed three dimensionally, such that spatial effects are perceived by viewers. Therefore, if two dimensional menu screens are displayed during stereoscopic vision by viewers, the image becomes disorienting. Accordingly, there is a problem that stereoscopic viewing may be precluded because of the presence of the menu screens, regardless of the fact that the stereoscopic image is being displayed.

Japanese Unexamined Patent Publication No. 8 (1996)-249493 discloses a technique to be employed in compound lens cameras in order to solve this problem. In this technique, text and symbols are overlapped on each of two images which are used for stereoscopic viewing such that there is parallax therebetween. Thereby, the text and symbols are displayed three dimensionally in addition to the images, which are displayed three dimensionally. If this technique is applied, disorientation during stereoscopic viewing can be prevented, because the text and symbols are also displayed three dimensionally.

When three dimensional display is performed, the spatial effect during stereoscopic viewing differs according to the distance from subjects, which are included in images, to imaging sections. Specifically, spatial effects are perceived strongly in cases that subjects are at positions close to imaging sections during photography, because the amount of parallax is great. Conversely, spatial effects are perceived weakly in cases that subjects are at positions far from imaging sections during photography, because the amount of parallax is small. In the technique disclosed in Japanese Unexamined Patent Publication No. 8 (1996)-249493, text and symbols having a preset amount of parallax therebetween are overlapped on stereoscopic images. Therefore, the text and symbols can only express a constant spatial effect. Therefore, in cases that the amounts of parallax of subjects included in images differ from the amount of parallax of the text and symbols, the display of text and symbols becomes disorienting.

SUMMARY OF THE INVENTION

The present invention has been developed in view of the foregoing circumstances. It is an object of the present invention to display stereoscopic images and regions other than the stereoscopic images in a manner which is not disorienting.

A stereoscopic image display apparatus according to the present invention comprises:

image obtaining means, for obtaining a plurality of images, which are obtained by photography of a subject from different positions;

distance measuring means, for measuring the distance to the subject;

stereoscopic image generating means, for generating a stereoscopic image for three dimensional display from the plurality of images;

display region generating means, for generating display regions that display the images in manners corresponding to the distance, when the display regions are displayed overlapped in the stereoscopic image; and display means, for displaying the stereoscopic image, on which the display regions are overlapped.

The distances can be measured by the stereo matching technique, in which the principle of triangulation is applied to differences in the positions (parallax) of corresponding pixels within the plurality of images, to calculate the distance to a subject corresponding to the pixel. Alternatively, the distances can be measured by the TOF (Time Of Flight) technique that measures distances to subjects employing the reflection of light.

Various known techniques may be employed to generate the stereoscopic image. These known techniques include: the aforementioned shifted arrangement of the plurality of images to enable stereoscopic viewing by the naked eye parallel viewing method; overlapping the plurality of images, in which the colors therein are changed to red and blue; overlapping the plurality of images, in which the polarization directions are changed; and combining the plurality of images such that the lines thereof are alternately arranged.

A configuration may be adopted, wherein the stereoscopic image display apparatus further comprises:

memory means, for storing a table in which various types of distance sections are correlated with display parameters; and wherein:

the display region generating means refers to the table to obtain display parameters correlated with the distance sections corresponding to the distance, and generates the display regions that display the images in manners corresponding to the distance, based on the display parameters.

The display parameters may include amounts of parallax corresponding to distances. Further, the display parameters may include sizes corresponding to distances in addition to the amounts of parallax.

A configuration may be adopted in which the stereoscopic image display apparatus of the present invention further comprises:

command input means, for inputting commands to change the manner in which images are displayed; and wherein:

the display region generating means changes the manners in which the display regions are displayed, in response to the input commands.

A configuration may be adopted in which the stereoscopic image display apparatus of the present invention may further comprises:

zoom means, for enlarging and reducing the stereoscopic image; and wherein:

the display region generating means changes the sizes of the display regions, corresponding to zoom magnifications.

In the stereoscopic image display apparatus of the present invention, a configuration may be adopted wherein:

the display means is capable of switching between display of the stereoscopic image and two dimensional display of at least one of the plurality of images; and the display region generating means generates the display regions with decreased brightness in cases that the stereoscopic image is to be displayed, compared to the level of brightness in cases that the images are displayed two dimensionally.

The term "two dimensional display" refers to displaying the pluralities such that stereoscopic viewing is not possible, such as displaying only one of the plurality of images, or arranging and displaying all or a portion of the plurality of images.

In the stereoscopic image display apparatus of the present invention, a configuration may be adopted wherein:

the display means displays at least one of the plurality of images two dimensionally in the case that the distances are less than or equal to a predetermined threshold value; and the display region generating means generates display regions as images displayed two dimensionally, in the case that the at least one image is to be displayed two dimensionally.

A stereoscopic image display method according to the present invention comprises the steps of:

obtaining a plurality of images, which are obtained by photography of a subject from different positions;

for measuring the distance to the subject;

generating a stereoscopic image for three dimensional display from the plurality of images;

generating display regions that display the images in manners corresponding to the distance, when the display regions are displayed overlapped in the stereoscopic image; and displaying the stereoscopic image, on which the display regions are overlapped.

Note that the stereoscopic image display method of the present invention may be provided as a program that causes a computer to execute the above steps.

Note also that the program may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention.

Additionally, computer instructions include, but are not limited to: source, object, and executable code, and can be in any language, including higher level languages, assembly language, and machine language.

According to the present invention, the plurality of images are obtained, the distance to the subject is measured, and the stereoscopic image is generated from the plurality of images. When predetermined display regions are to be displayed overlapped on the stereoscopic image, the display regions are generated such that they can be displayed in a manner corresponding to the measured distance, then displayed overlapped on the stereoscopic image. Therefore, the display regions are displayed three dimensionally such that they express spatial effects corresponding to the distance of the subject included in the stereoscopic image. Accordingly, the display regions can be stereoscopically viewed with the stereoscopic image without a sense of disorientation.

Here, in order to display the display regions three dimensionally, it is necessary to consider the amount of parallax of the display regions and further, the sizes thereof which are suitable for the distance to the subject included in the stereoscopic image. Further, the degrees of parallax and size differ depending on various factors, such as the positional relationships among cameras that perform photography of the subject, the angular fields of view of lenses, and the focal distances of the lenses. For this reason, a long time will be required if the parallax and the sizes of the display regions to be displayed in a manner corresponding to the distance are calculated each time that the display regions are to be displayed.

Therefore, a table, in which various types of distance sections are correlated with display parameters, is prepared, and display parameters corresponding to the distance section are obtained by referring to the table. Generation of the display regions can be performed in short amounts of time, by generating the display regions that display the images in manners corresponding to the distance, based on the obtained display parameters.

A configuration may be adopted, wherein the display region generating means changes the manners in which the display regions are displayed, in response to input commands to change the manner in which images are displayed. In this case, the display regions may be displayed three dimensionally in a desired manner of display.

A configuration may be adopted, wherein the display region generating means changes the sizes of the display regions, corresponding to zoom magnifications. In this case, the display regions can be displayed in a non disorienting manner, even if the zoom magnification of the stereoscopic image is changed.

A configuration may be adopted, wherein the display means is capable of switching between display of the stereoscopic image and two dimensional display of at least one of the plurality of images. In this case, if the display regions to be displayed with the stereoscopic image are generated having the brightness during two dimensional display, the display regions become extremely difficult to view. For this reason, the display region generating means generates the display regions with decreased brightness in cases that the stereoscopic image is to be displayed, compared to the level of brightness in cases that the images are displayed two dimensionally. Thereby, the display regions being displayed such that they are difficult to view can be prevented.

A configuration may be adopted, wherein the display regions are three dimensionalized when they are generated. In this case, the display regions can be displayed three dimensionally in an even less disorienting manner.

A configuration may be adopted, wherein the display region generating means generates display regions as images displayed two dimensionally, in the case that at least of the plurality of images is to be displayed two dimensionally. In this case, the display regions are displayed in a non disorienting manner during two dimensional display.

BEST MODE FOR CARRYING OUT THE INVENTION

Figure 1:
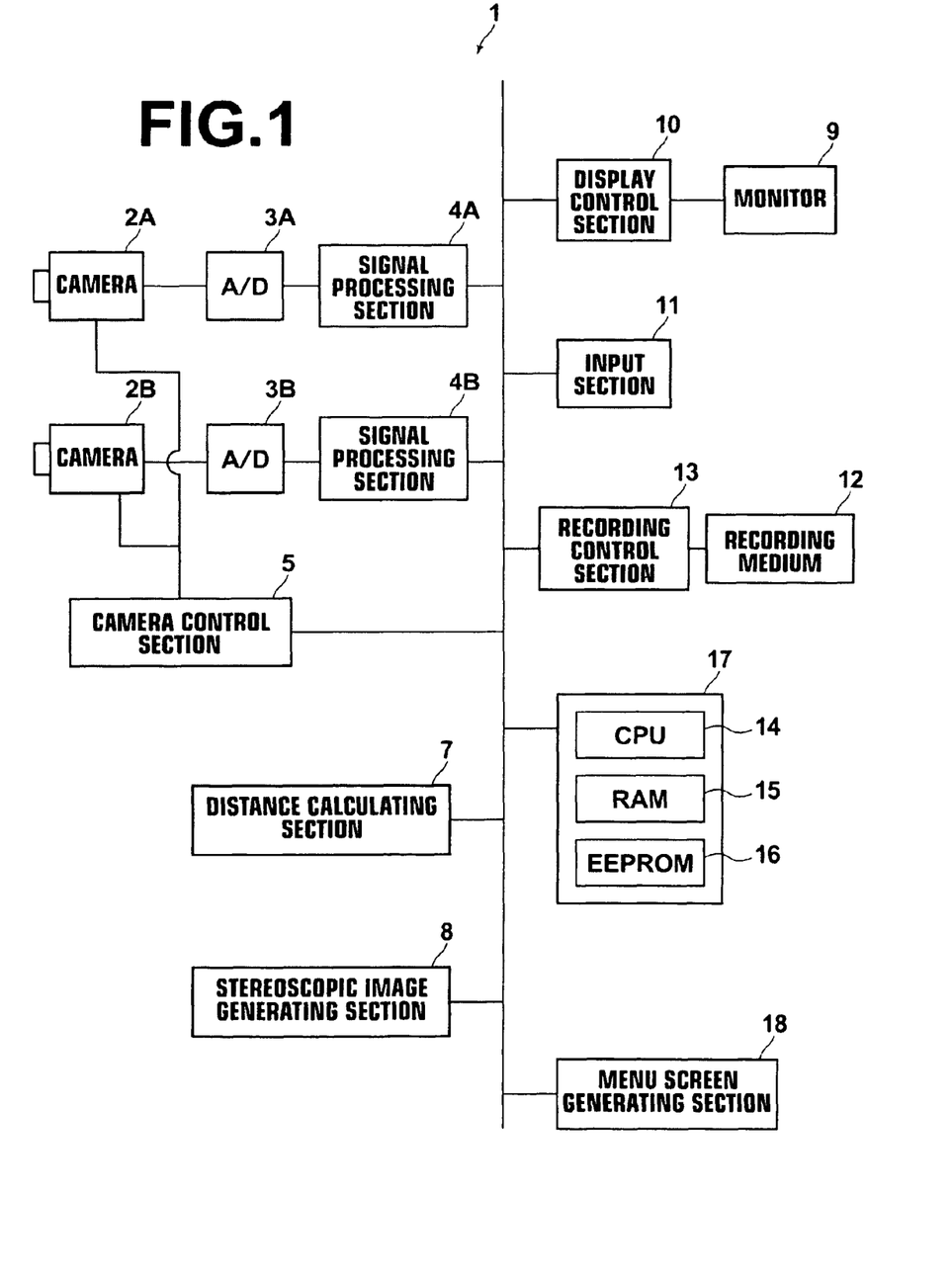
FIG. 1 is a schematic block diagram that illustrates the construction of a stereoscopic imaging apparatus according to an embodiment of the present invention, to which the stereoscopic image display apparatus of the present invention is applied.

Hereinafter, an embodiment of the present invention will be described with reference to the attached drawings. FIG. 1 is a schematic block diagram that illustrates the construction of a stereoscopic imaging apparatus 1, to which the stereoscopic image display apparatus of the present invention is applied. As illustrated in FIG. 1, the stereoscopic imaging apparatus 1 according to the present embodiment is equipped with: two cameras 2A and 2B; A/D converting sections 3A and 3B; signal processing sections 4A and 4B, and a camera control section 5.

The cameras 2A and 2B are for obtaining an image for the left eye and an image for the right eye, respectively. Each of the cameras 2A and 2B are equipped with a photography lens and an imaging element, such as a CCD. The camera control section 5 controls focusing operations and zooming operation of the photography lenses, as well as the timing at which electric charges are read out from the imaging elements. The cameras 2A and 2B are provided with a predetermined interval therebetween. The baseline length, which is the interval between the cameras 2A and 2B, as well as the convergence angle thereof may be changed. Note that in the present embodiment, the cameras 2A and 2B photograph through the lens images until photography operations are performed, and obtain still images at the timing that the photography operations are performed.

The A/D converting sections 3A and 3B convert images SA and SB, which are obtained by the cameras 2A and 2B by photography, into digital data from analog data.

The signal processing sections 4A and 4B administer correcting processes to correct fluctuations in sensitivity distributions and distortions of optical systems with respect to image data of the images SA and SB obtained by the cameras 2A and 2B. In addition, a parallelizing process to parallelize the images SA and SB are administered. Further, image processes such as a white balance adjusting process, a gradation correcting process, a sharpness correcting process, and a color correcting process, are administered onto the parallelized images. Note that the images which have been processed by the signal processing sections 4A and 4B will also be denoted with the same reference letters SA and SB as the images prior to processing. In addition, the correcting processes, the parallelizing processes, and the image processes are collectively referred to as signal processes.

The stereoscopic imaging apparatus 1 is also equipped with a distance calculating section 7 and a stereoscopic image generating section 8.

The distance calculating section 7 measures the distance from the cameras 2A and 2B to a subject included in the photography ranges of the cameras 2A and 2B. First, the stereo matching technique is employed to find corresponding points within the images SA and SB which are obtained by the cameras 2A and 2B. The corresponding points are found by obtaining correlative values among portions (3×3 pixel portions, for example) of the images SA and SB. The distance from the cameras 2A and 2B to the subject included in common within the images SA and SB is calculated by the principle of triangulation, employing the corresponding points, the baseline length between the cameras 2A and 2B, the convergence angle, and the zoom magnification. Specifically, distances are calculated for each pixel which is present within both images SA and SB. Further, the distance calculating section 7 calculates a subject distance, which is an average distance from the cameras 2A and 2B to a main subject, which is included in the images SA and SB. Here, a method in which predetermined regions at the centers of the images SA and SB are designated as the main subject, or a method in which a region detected as a main subject from within either of the images SA and SB is designated as the main subject, may be employed as the method for detecting the main subject.

The stereoscopic image generating section 8 generates a stereoscopic image SR, by arranging the images SA and SB side by side.

The stereoscopic imaging apparatus 1 is also equipped with: a monitor 9, such as a liquid crystal display, for displaying the images SA and SB as well as the stereoscopic image SR; a display control section 10, for controlling the display of various types of data on the monitor 9; a cruciform key, for enabling various types of input to the stereoscopic imaging apparatus 1; an input section 11 including an operation button, a zoom lever, a shutter release button, and the like; and a recording control section 13, for recording stereoscopic images SR into recording media 12, such as memory cards. The stereoscopic imaging apparatus 1 is further equipped with: a CPU 14; a RAM 15, in which operation/control programs are stored and which also functions as a work region; and a total control section 17, constituted by an EEPROM 16, in which various set values including the tables to be described later, are recorded.

Further, the stereoscopic imaging apparatus 1 is equipped with a menu screen generating section 18, for generating menu screens according to display modes corresponding to subject distances calculated by the distance calculating section 7, when displaying the menu screens for performing various operations.

Figures 2A, 2B:
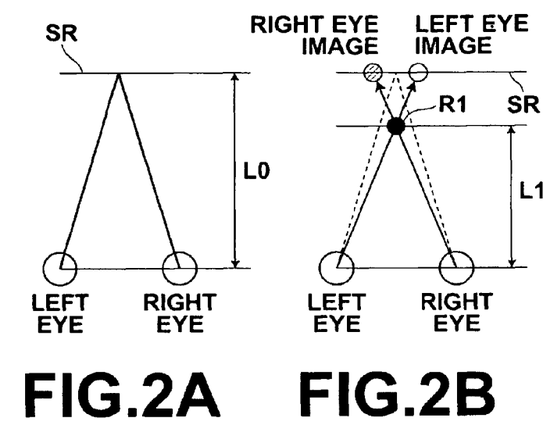
FIGS. 2A, 2B, and 2C are diagrams for explaining parallax.
Figure 2C:
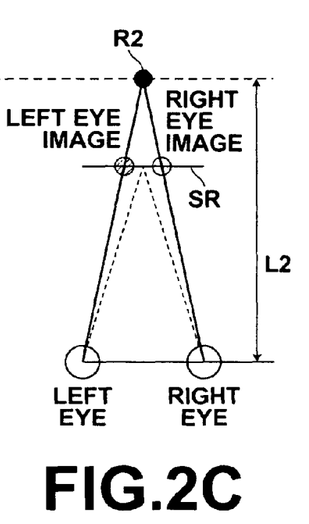

Here, parallax in cases that stereoscopic viewing is performed will be described. FIGS. 2A, 2B, and 2C are diagrams for explaining parallax. First, a distance from both eyes to a stereoscopic image SR when the stereoscopic image SR is observed in a state in which stereoscopic viewing is not performed is designated as an adjustment distance L0, which is a reference distance for perspective.

Regarding stereoscopic images SR, parallax becomes greater in cases that subjects are closer to the cameras 2A and 2B. Therefore, the left and right positions at which an image of a subject for the left eye (left eye image) and an image of the subject for the right eye (right eye image) are arranged are reversed. Accordingly, the lines of sight of the left and right eye are crossed in front of the stereoscopic image SR as illustrated in FIG. 2B to realize merged viewing. Thereby, a stereoimage R1 can be observed in front of the stereoscopic image SR. In this case, the distance L1 from the eyes to the stereoimage R1 is smaller than the adjustment distance L0.

On the other hand, parallax becomes smaller in stereoscopic images SR in which subjects are far from the cameras 2A and 2B. Therefore, the left and right positions at which an image of a subject for the left eye (left eye image) and an image of the subject for the right eye (right eye image) are arranged are maintained. Accordingly, the lines of sight of the left and right eye are crossed beyond the stereoscopic image SR as illustrated in FIG. 2C to realize merged viewing. Thereby, a stereoimage R2 can be observed beyond the stereoscopic image SR. In this case, the distance L2 from the eyes to the stereoimage R2 is greater than the adjustment distance L0.

In this manner, subjects which are included in stereoscopic images SR may appear to be positioned toward the front or toward the rear when stereoscopically viewing the stereoscopic images SR, according to the distance between the cameras 2A, 2B and the subjects at the time of photography.

In the present embodiment, the menu screen generating section 18 generates menu screens for three dimensional display having parallax and sizes corresponding to the subject distances calculated by the distance calculating section 7, when menu screens are to be displayed.

Figure 3:
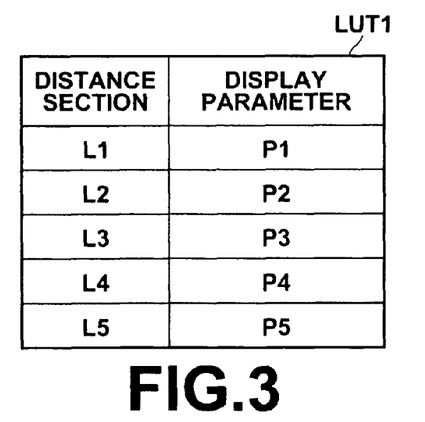
FIG. 3 is a diagram that illustrates a look up table, in which distance sections and display parameters are correlated.

In the present embodiment, a look up table LUT1, in which various distance sections and display parameters corresponding to each distance section are correlated to each other, is recorded in the EEPROM 16. FIG. 3 is a diagram that illustrates the look up table LUT1. As illustrated in FIG. 3, five distance sections L1 through L5 and display parameters P1 through P5, each corresponding to the distance sections, are correlated to each other in the look up table LUT1. The overlapping positions of menu screens, parallax of menu screens that overlap both the images SA and SB, and the sizes of menu screens (the number of pixels) are employed as the display parameters. Not that the display parameters are set such that parallax decreases as the subject distance increases and becomes negative, that is, inverted, at great distances in the look up table LUT1. IN addition, the display parameters are set such that the sizes of menu screens decrease as the subject distance decreases. Note that the look up table LUT1 is generated taking various factors, such as the positional relationship between the cameras 2A and 2B, the imaging angles of the lenses of the cameras 2A and 2B, and the focal distances of the lenses, into consideration.

Note that the overlapping positions of menu screens refers to a pixel position within the image SA at which a pixel at the upper left corner of a menu screen is positioned. If the overlapping position of the menu screen in the image SA is determined, the display position of the menu screen in the image SB is determined by the parallax. Therefore, only the pixel position within the image SA, at which the pixel at the upper left corner of the menu screen is positioned, needs to be included in the display parameters. Note that a pixel position within the image SA, at which a pixel at the upper left corner of a menu screen is positioned, and a pixel position within the image SB, at which a pixel at the lower right corner of the menu screen is positioned, may be included in the display parameters instead of determination by parallax. In this case, the overlapping positions of the menu screens within the images SA and SB are set to correspond to parallax.

When a menu screen is to be displayed, the display control section 10 overlaps a menu screen on each of the images SA and SB, which are included in a stereoscopic image SR, and displays the stereoscopic image SR overlapped by the menu screens on the monitor 9.

Figure 4A:
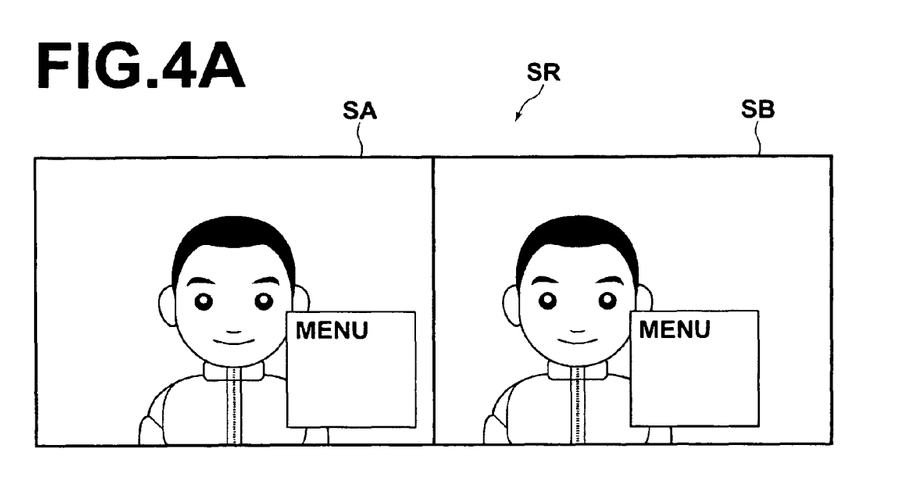
FIGS. 4A and 4B are diagrams that illustrate stereoscopic images which are overlapped by menu screens.
Figure 4B:
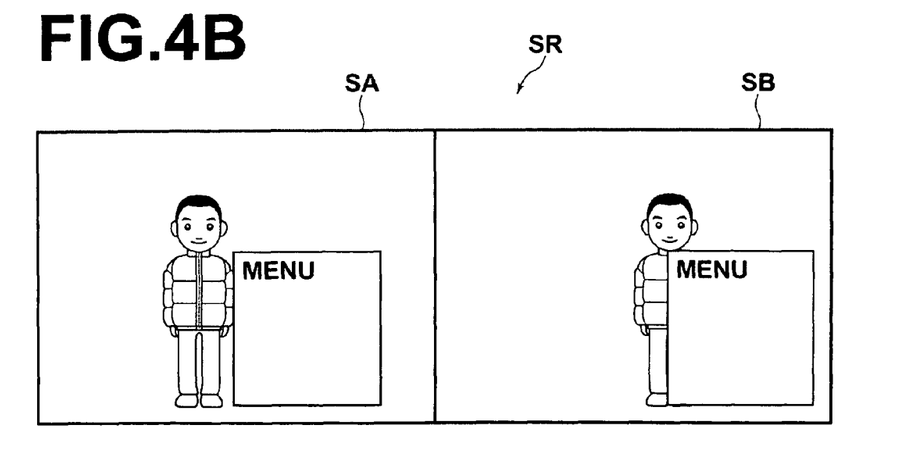

FIGS. 4A and 4B are diagrams that illustrate stereoscopic images which are overlapped by menu screens. FIG. 4A illustrates a case in which the subject distance is small, and FIG. 4B illustrates a case in which the subject distance is great. In the case that the subject distance is small, the parallax between the menu screens that overlap each of the images SA and SB is set to be great, and the sizes thereof are set to be small. For this reason, when the stereoscopic image SR is stereoscopically viewed, the menu screen will appear toward the viewer in a manner similar to the subject.

On the other hand, in the case that the subject distance is great, the menu screens that overlap each of the images SA and SB have parallax in a direction opposite that of FIG. 4A, and the sizes thereof are greater than those of FIG. 4A. For this reason, when the stereoscopic image SR is stereoscopically viewed, the menu screen will appear set back in a manner similar to the subject.

Figure 5:
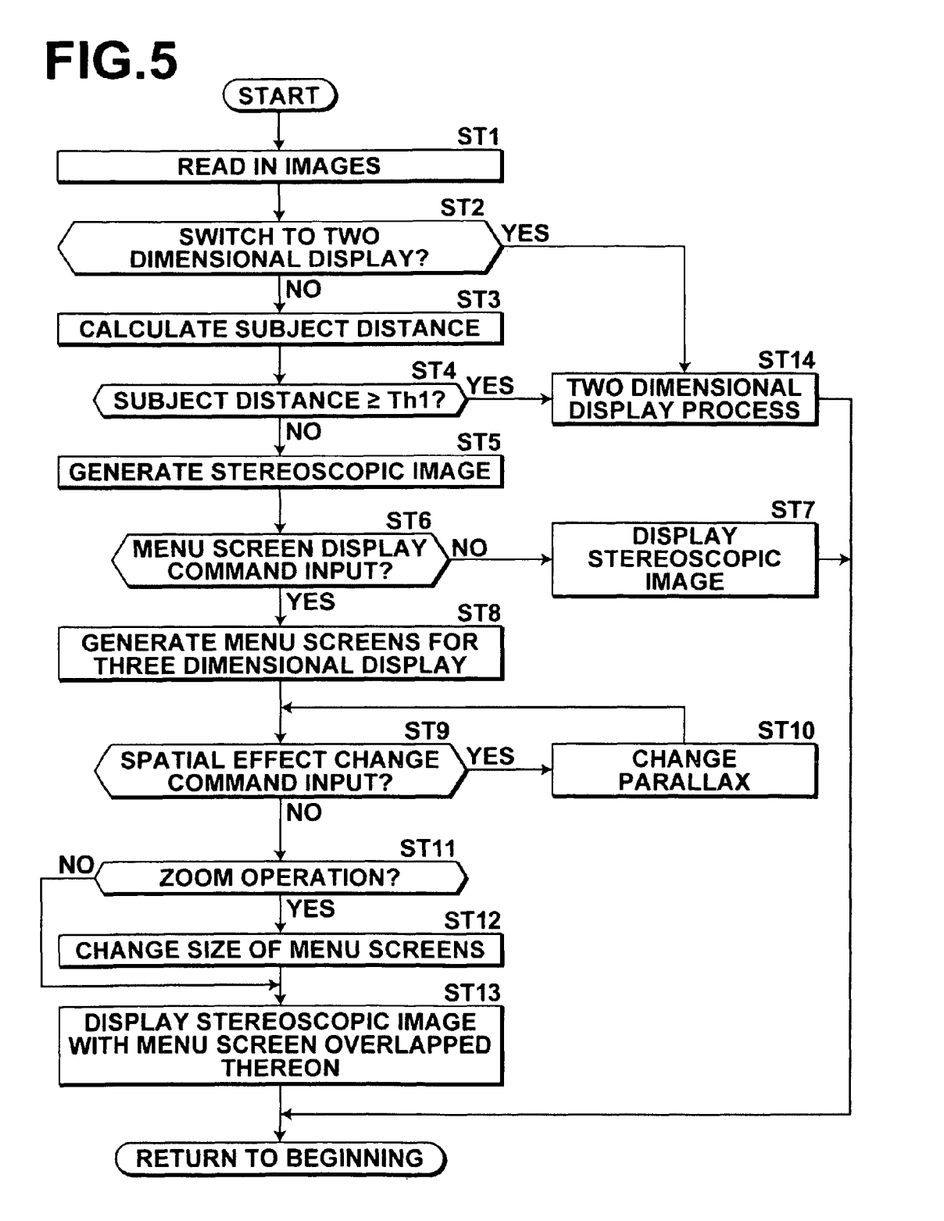
FIG. 5 is a flow chart that illustrates the steps of the process performed by the embodiment of the present invention.

Next, the process performed by the first embodiment will be described. FIG. 5 is a flow chart that illustrates the steps of the process performed by the present embodiment. Note that in an initial state, the stereoscopic imaging apparatus is configured to generate a stereoscopic image SR from images obtained by imaging, and to display the stereoscopic image SR three dimensionally. Here, a process will be described in which through the lens images are obtained. First, the power of the stereoscopic imaging apparatus 1 is turned ON so that the total control section 17 starts the process, and images SA and SB, which have been obtained by the cameras 2A and 2B, and which have undergone A/D conversion and signal processes, are read into the RAM 15 (step ST1). Next, the total control section 17 judges whether a command for switching from three dimensional display to two dimensional display has been input (step ST2). If the result of judgment in step ST2 is affirmative, the steps of a two dimensional display process to be described later are performed.

If the result of judgment in step ST2 is negative, the distance calculating section 7 calculates the subject distance of a subject included in images SA and SB (step ST3). Then, the total control section 17 judges whether the subject distance is greater than or equal to a predetermined threshold value Th1 (step ST4).

If the result of judgment in step ST4 is negative, the stereoscopic image generating section 8 generates a stereoscopic image SR (step ST5). Next, the total control section 17 judges whether a command for displaying a menu screen has been input (step ST6). If the judgment in step ST6 is negative, the display control section 10 cases the stereoscopic image SR to be displayed on the monitor 9 (step ST7), and the process returns to the beginning.

If the result of judgment in step ST6 is positive, the menu screen generating section 18 refers to the look up table LUT1, and generates menu screens having parallax and sizes corresponding to the subject distance (step ST8). Note that the brightness of the menu screens for three dimensional display is set to be darker than the brightness of menu screens for two dimensional display, to be described later. Further, the total control section 17 judges whether a command to change the spatial effects of the menu screen has been input (step ST9). If the result of judgment in step ST9 is affirmative, the menu screen generating section 18 changes the parallax between the menu screens to be overlapped onto the images SA and SB (step ST10), and the process returns to step ST9. That is, in the case that a command to increase the spatial effect has been input, the parallax is increased, and in the case that a command to decrease the spatial effect has been input, the parallax is decreased.

If the result of judgment in step ST10 is negative, the total control section 17 judges whether a zoom operation has been performed (step ST11). If the result of judgment in step ST11 is affirmative, the menu screen generating section 18 changes the sizes of the menu screens according to the zoom magnification (step ST12). That is, in the case that the zoom magnification is increased, the sizes of the menu screens are enlarged, and in the case that the zoom magnification is decreased, the sizes of the menu screens are reduced. Note that the process proceeds to step ST13 in the case that the result of judgment in step ST11 is negative.

Thereafter, the display control section 10 causes a menu screen to be overlapped on each of the images SA and SB, which are included in the stereoscopic image SR, causes the stereoscopic images SR illustrated in FIGS. 4A and 4B to be displayed on the monitor 9 (step ST13), and the process returns to the beginning.

Figure 6:
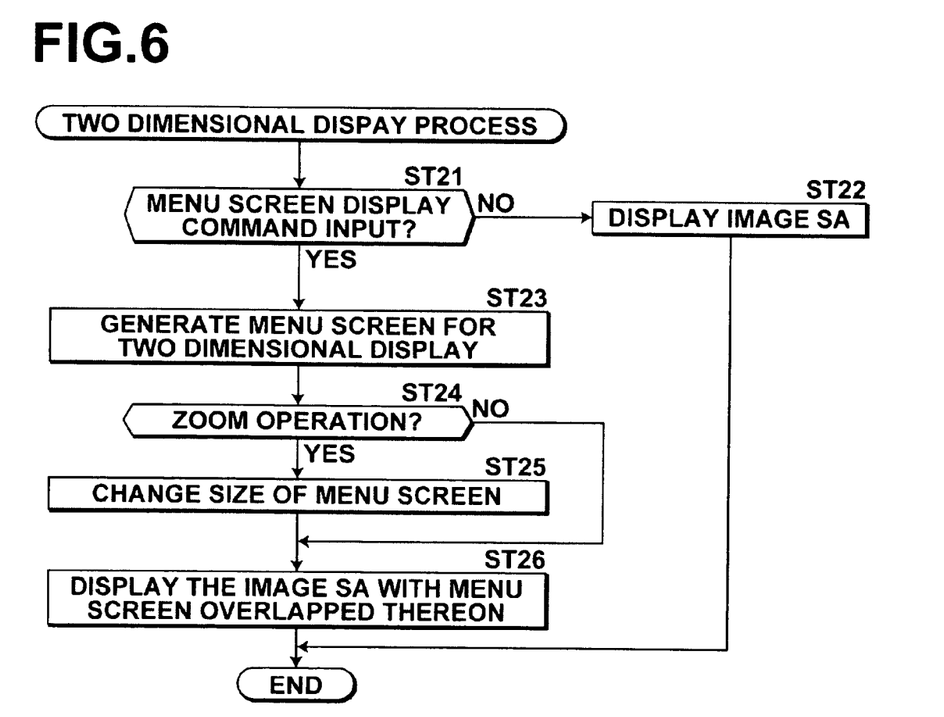
FIG. 6 is a flow chart that illustrates the steps of a two dimensional display process.

On the other hand, in the case that the result of either of the judgments in step ST2 or ST4 is negative, a process for two dimensional display is performed (step ST14). FIG. 6 is a flow chart that illustrates the steps of the two dimensional display process. First, the total control section 17 judges whether a command for displaying a menu screen has been input (step ST21). If the result of judgment in step ST21 is negative, the display control section 10 causes the image SA to be displayed on the monitor 9 (step ST22), and the process ends. Note that the image SB may be displayed instead of the image SA. As a further alternative, the images SA and SB may both be displayed in a state in which they are arranged with an interval therebetween.

If the result of judgment in step ST21 is affirmative, the menu screen generating section 18 generates a menu screen for two dimensional display (step ST23). In the present embodiment, the size and display position of the menu screen for two dimensional display are stored as display parameters for two dimensional display in the EEPROM 16. The menu screen generating section 18 reads out the display parameters for two dimensional display from the EEPROM 16, and generates the menu screen for two-dimensional display. Note that the brightness of the menu screen for two dimensional display is set to be brighter than that of the menu screens for three dimensional display.

Further, the total control section 17 judges whether a zoom operation has been performed (step ST24). If the result of judgment in step ST24 is affirmative, the menu screen generating section 18 changes the sizes of the menu screens according to the zoom magnification (step ST25). That is, in the case that the zoom magnification is increased, the size of the menu screen is enlarged, and in the case that the zoom magnification is decreased, the size of the menu screen is reduced. Note that the process proceeds to step ST26 in the case that the result of judgment in step ST24 is negative.

Thereafter, the display control section causes a menu screen to be overlapped on the images SA, causes the image SA to be displayed on the monitor 9 (step ST26), and the process for two dimensional display ends.

According to the present embodiment, when a command to display a menu screen when displaying a stereoscopic image SR is input, the menu screens are generated such that they have parallax and are of sizes corresponding to the subject distance. Then, the menu screens are displayed overlapped on the stereoscopic image SR. Therefore, the menu screens are displayed three dimensionally such that they express spatial effects corresponding to the distance of the subject included in the stereoscopic image SR. Accordingly, the menu screens can be stereoscopically viewed with the stereoscopic image SR without a sense of disorientation.

Here, in order to display the menu screen three dimensionally, it is necessary to consider the sizes of the menu screens which are suitable for the distance to the subject included in the images SA and SB, in addition to the amount of parallax thereof. Further, the degrees of parallax and sizes differ depending on various factors, such as the positional relationships among cameras that perform photography of the subject, the angular fields of view of lenses, and the focal distances of the lenses. For this reason, a long time will be required if the parallax and the sizes of the menu screen to be displayed in a manner corresponding to the distance are calculated each time that the menu screen are to be displayed.

Therefore, the look up table LUT1, in which various distance sections L1 through L5 are correlated with display parameters P1 through P5, is prepared, and display parameters corresponding to the distance section are obtained by referring to the look up table LUT1. Generation of the menu screens can be performed in short amounts of time, by generating the menu screens for three dimensional display in manners corresponding to the distance, based on the obtained display parameters.

Note that because display parameters change according to the positional relationships between cameras, such as the baseline length therebetween and the convergence angle, a plurality of look up tables LUT1 may be prepared corresponding to various positional relationships between the cameras. In this case, the look up table corresponding to the positional relationship of the cameras 2A and 2B may be referred to when obtaining the display parameters, when generating the menu screens.

Note that commands to change the spatial effects of images may be input. In this case, the menu screen may be displayed three dimensionally such that desired spatial effects are obtained, by changing the parallax between the menu screens according to the commands.

Figure 7:
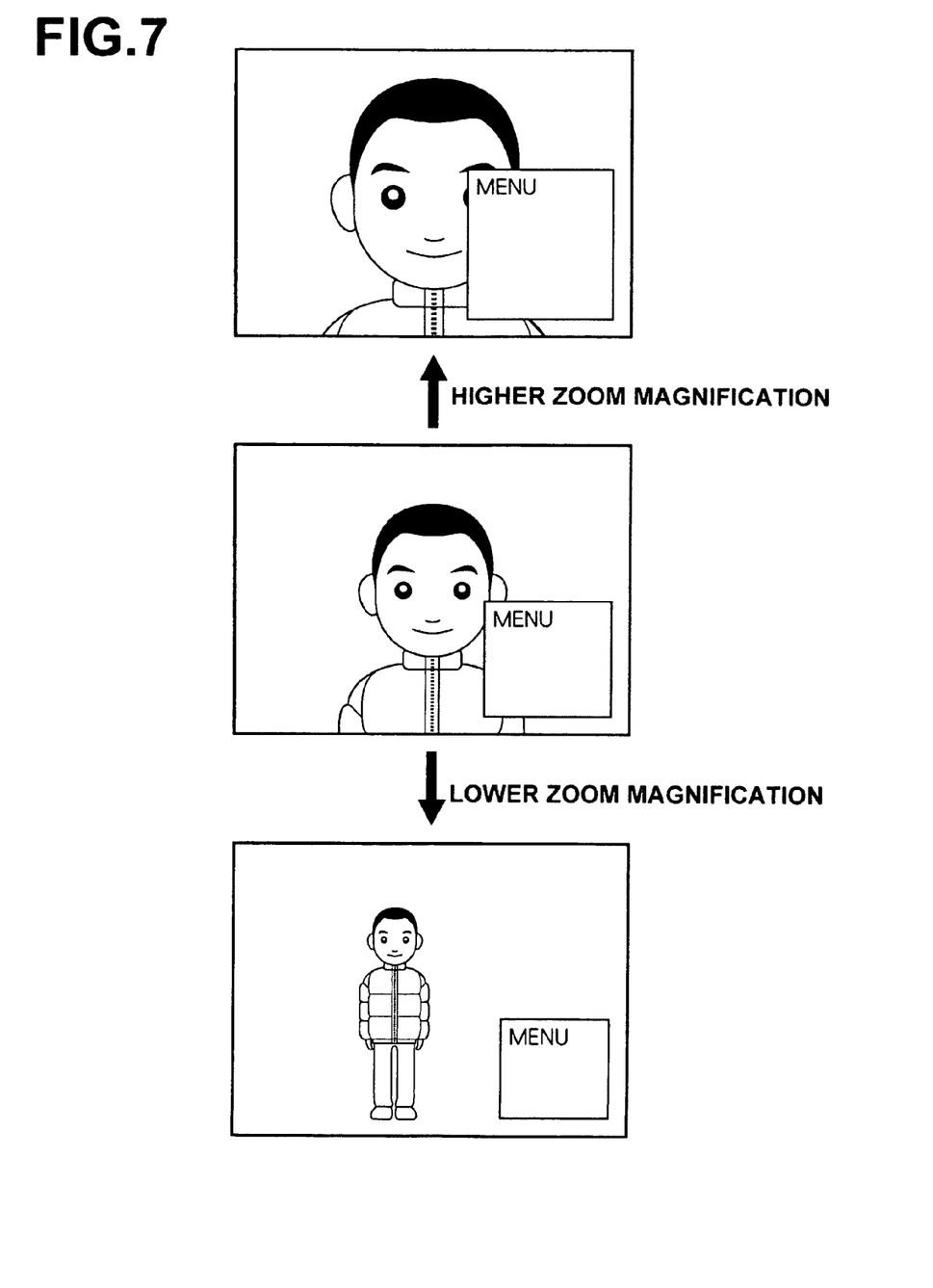
FIG. 7 is a diagram that illustrates the manners in which menu screens are displayed in cases that zoom magnification is changed.

In addition, the menu screens are generated with sizes corresponding to zoom magnifications. Thereby, the sizes of the menu screens are enlarged when the zoom magnification is high, and reduced when the zoom magnification is low, as illustrated in FIG. 7. Thereby, the menu screen can be displayed three dimensionally without causing disorientation, even if a zoom function is utilized.

Switching between three dimensional display and two dimensional display is enabled. In this case, if the menu screen to be displayed three dimensionally are generated having the same brightness as that during two dimensional display, the menu screen becomes extremely difficult to view. For this reason, the menu screens which are displayed three dimensionally are generated with decreased levels of brightness compared to the level of brightness in cases that the menu screen is displayed two dimensionally. Thereby, the three dimensionally displayed menu screen being difficult to view can be prevented.

Figure 8:
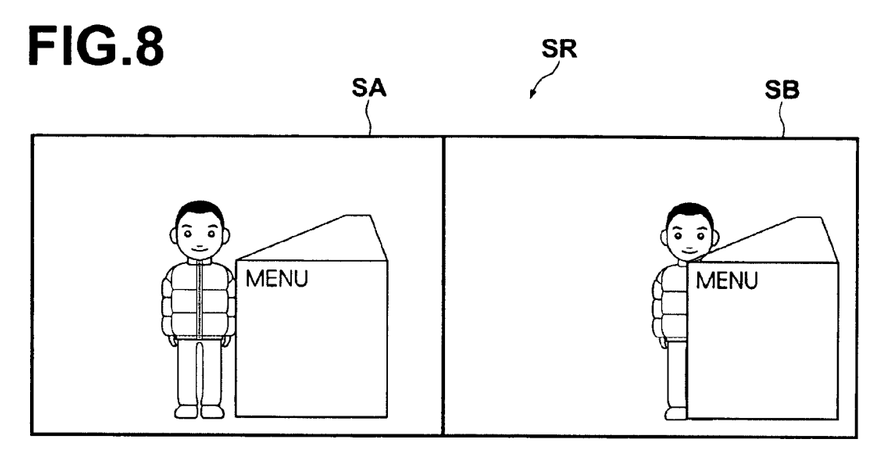
FIG. 8 is a diagram that illustrates a three dimensional menu screen.

Note that in the embodiment described above, the menu screens are two dimensional. Alternatively, a configuration may be adopted, wherein the menu screens are generated as three dimensional images, as illustrated in FIG. 8. In this case, the menu screen can be displayed three dimensionally in an even less disorienting manner.

In the embodiment described above, the image SA is displayed two dimensionally without generating a stereoscopic image SR in cases that the subject distance is greater than or equal to the threshold value Th1. Alternatively, stereoscopic images SR may be generated without judging whether the subject distance is greater than or equal to the threshold value Th1.

In the embodiment described above, input of commands to change the spatial effect is received. Alternatively, the menu screens may be displayed without receiving commands to change the spatial effect.

In the embodiment described above, the sizes of the menu screens are changed in cases that the zoom magnification is changed. Alternatively, the sizes of the menu screens may be kept constant, even if the zoom magnification is changed.

In the embodiment described above, the menu screens are generates such that the amount of parallax and the sizes of the menu screens correspond to the subject distance. Alternatively, the menu screens may be generated such that only the amount of parallax corresponds to the subject distance.

In the embodiment described above, the parallax and the sizes of the menu screens corresponding to the subject distance are obtained by referring to the look up table LUT1. Alternatively, the parallax and sizes of the menu screens can be calculated according to a predetermined formula, when generating the menu screens. An example of a method for calculating the amount of parallax corresponding to a subject distance is: parallax=subject distance·a constant.

In the embodiment described above, the stereoscopic image SR, in which the images SA and SB are arranged next to each other, is generated. Alternatively, each of the images SA and SB may be thinned out by one alternating line that extends in the vertical direction, then each line of the thinned out images SA and SB may be alternately arranged, to generate a stereoscopic image SR. In this case, it is necessary for the monitor 9 to be a three dimensional display monitor. As further alternatives, the images SA and SB may be changed, such as into red and blue, or the polarization directions of the images SA and SB may be changed, and a stereoscopic image SR may be generated by overlapping the images SA and SB. In this case, it is necessary for users who view the stereoscopic image SR to wear specialized goggles.

In the embodiment described above, distances are measured by employing the stereo matching method. Alternatively, the TOF (Time of Flight) method, in which distances to subjects are measured employing the reflection of light, may be employed to calculate distances. In this case, the stereoscopic imaging apparatus 1 will further comprise: a light emitting section, for emitting a measuring light beam, such as an infrared light beam; an imaging section, for receiving a reflected light beam, which is the measuring light beam reflected by a subject; and a distance calculating section, for calculating the distance to the subject based on phase differences between the measuring light beam and the reflected light beam.

In the embodiment described above, the menu screen is overlapped onto the stereoscopic image SR. The present invention may also be applied to cases in which display regions other than menu screens are overlapped onto stereoscopic images and displayed.

In the embodiment described above, the imaging sections 2A and 2B of the stereoscopic apparatus 1 obtains the images SA and SB, and the images SA and SB are employed to generate the stereoscopic image SR. Alternatively, the imaging sections 2A and 2B may be provided separately from a stereoscopic image display apparatus. In this case, images SA and SB obtained by the imaging sections 2A and 2B are input to the stereoscopic image display apparatus, and generation and display of stereoscopic image SR may be performed employing the input images SA and SB.

In the embodiment described above, two imaging sections are provided in the stereoscopic imaging apparatus 1, and the stereoscopic image SR is generated from two images SA and SB. The present invention may also be applied to cases in which three or more imaging sections are provided, and stereoscopic images SR are generated employing three or more images.

An embodiment of the present invention has been described. A program that causes a computer to function as the menu screen generating section 18 described above and to execute the processes illustrated in FIG. 5 and FIG. 6 is also an embodiment of the present invention. In addition, a computer readable recording medium having such a program recorded therein is also an embodiment of the present invention.

What is claimed is:

1. A stereoscopic image display apparatus, comprising:
an image obtaining unit, for obtaining a plurality of images, which are obtained by photography of a subject from different positions by a photography unit;
a distance measuring unit, for measuring a distance to the subject from the photography unit;
a stereoscopic image generating unit, for generating a stereoscopic image for three dimensional display from the plurality of images;
a display region generating unit, for generating display regions that display the images having amounts of parallax and sizes corresponding to the distance, when the display regions are displayed overlapped in the stereoscopic image;
a display unit, for displaying the stereoscopic image, on which the display regions are overlapped; and
a zoom unit for enlarging and reducing the stereoscopic image;
the display region generating unit comprising a unit for changing the sizes of the display regions according to the zoom magnification rate when the stereoscopic image is enlarged and reduced.

2. A stereoscopic image display apparatus as defined in claim 1, further comprising:
a memory unit, for storing a table in which various types of distance sections are correlated with display parameters; and wherein:
the display region generating unit refers to the table to obtain display parameters correlated with the distance sections corresponding to the distance, and generates the display regions that display the images having amounts of parallax and sizes corresponding to the distance, based on the display parameters.

3. A stereoscopic image display apparatus as defined in claim 2, wherein:
the display parameters include amounts of parallax corresponding to distances.

4. A stereoscopic image display apparatus as defined in claim 1, further comprising:
a command input unit, for inputting commands to change the amounts of parallax with which images are displayed; and wherein:
the display region generating unit changes the amounts of parallax with which the display regions are displayed, in response to the input commands.

5. A stereoscopic image display apparatus as defined in claim 1, wherein:

the display unit is capable of switching between display of the stereoscopic image and two dimensional display of at least one of the plurality of images; and the display region generating unit generates the display regions with decreased brightness in cases that the stereoscopic image is to be displayed, compared to the level of brightness in cases that the images are displayed two dimensionally.

6. A stereoscopic image display apparatus as defined in claim 1, wherein:

the display region generating unit comprises a unit for generating display regions which are three dimensionalized.

7. A stereoscopic image display apparatus as defined in claim 1, wherein:

the display unit displays at least one of the plurality of images two dimensionally in the case that the distances are less than or equal to a predetermined threshold value; and the display region generating unit generates display regions as images displayed two dimensionally, in the case that the at least one image is to be displayed two dimensionally.

8. A stereoscopic image display method, comprising:

obtaining a plurality of images, which are obtained by photography of a subject from different positions by a photography unit, measuring a distance to the subject from the photography unit;

generating a stereoscopic image for three dimensional display from the plurality of images;

generating display regions that display the images having amounts of parallax and sizes corresponding to the distance, when the display regions are displayed overlapped in the stereoscopic image; and displaying the stereoscopic image, on which the display regions are overlapped; and changing the sizes of the display regions according to the zoom magnification rate when the stereoscopic image is enlarged reduced, the above steps being performed by a computer.

9. A computer readable, non-transitory medium having a program recorded therein that causes a computer to execute procedures of:

obtaining a plurality of images, which are obtained by photography of a subject from different positions by a photography unit;

measuring a distance to the subject from the photography unit;

generating a stereoscopic image for three dimensional display from the plurality of images;

generating display regions that display the images having amounts of parallax and sizes corresponding to the distance, when the display regions are displayed overlapped in the stereoscopic image; and displaying the stereoscopic image, on which the display regions are overlapped; and changing the sizes of the display regions according to a zoom magnification rate when the stereoscopic image is enlarged and reduced.

* * * * *